Sept. 3, 1963                C. S. ZILK                3,102,712
                          ELASTOMER VALVE
                        Filed Jan. 9, 1961

INVENTOR.
Carl S. Zilk
BY
Buckhorn, Cheatham & Blore
ATTORNEYS

United States Patent Office 3,102,712
Patented Sept. 3, 1963

3,102,712
ELASTOMER VALVE
Carl S. Zilk, 6312 SE. 48th Ave., Portland, Oreg.
Filed Jan. 9, 1961, Ser. No. 81,582
1 Claim. (Cl. 251—298)

This invention relates to valves, and particularly to valves for handling corrosive fluids or other fluids and constructed to isolate such fluids from the actuating mechanism of the valve.

A main object of the invention is to provide a valve of the above general type but which is much simpler, more compact and considerably less expensive than present valves, and which may be operated by a solenoid.

Another object is to provide a valve of miniature dimensions.

Another object is to provide such a valve in which the fluid being controlled flows through a sealing means which isolates the fluid from the valve element actuating means.

Various other objects of the present invention will be apparent from the following description taken in connection with the accompanying drawings, wherein.

Figure 1:
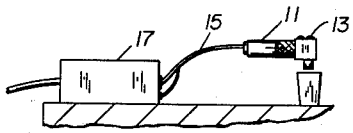
FIG. 1 is a view of a typical apparatus in which a valve of the present invention might be used.

FIG. 1 shows a dispensing apparatus generally of the type disclosed in my Patent 2,887,250. The apparatus includes a head or nozzle unit 11 to be held in the hand and having a number of switches 13 to be operated by the fingers of the hand holding the unit. The switches have conductors extending through a flexible plural conduit member 15 into a valve assembly housing 17. In the valve housing are a plurality of solenoid valves to control the supply of fluids through the flexible member 15 to the head unit 11 in accordance with the manner of operation of the switches on the head.

I have noted that when using available solenoid operated valves, some of the fluid being controlled, such as Tom Collins syrup, has a tendency to act unfavorably on certain of the parts with which it comes into contact.

While there are corrosion resistant valves available, they are complex, expensive and bulky, and/or incapable of properly controlling fluids under considerable pressure, for instance 50 to 100 pounds per square inch.

The valve of the persent invention is shown in FIGS. 2–5, and comprises a body made up of a pair of flow passages or body members 21 and 23 of corrosion resistant material clamped by screws or bolts 24 (FIG. 3) against the opposite sides of the annular elastomer portion 25 of a valve member 27. The portion 25 is of circular cross section. The flow members are provided with circular grooves of arcuate cross section to fit against the elastomer portion 25. The grooves locate the portion 25 coaxially with relation to an inlet passage 31 and an outlet passage 33 formed in the flow passage members.

Inlet passage 31 leads into a circular recess 35 formed in the member 23. The inner end of the outlet passage 33 is defined by a circular raised valve seat 37 formed on the member 21.

A circular elastomer valve element 41 is located generally within the opening defined by the annular portion 25 and has an integral elastomer shank portion 43 integrally connected to the annular portion 25. The shank portion 43 has an extension portion 45, and a relatively rigid metal actuating element in the form of a lever 47 extends through the portions 43 and 45 and into the valve element 41. The flow passage members 21 and 23 have recesses at 49 and 51 to accommodate vertical pivotal movement of the extension portion 45 and the lever 47. The lever pivots about point P in FIG. 2.

Figure 2:
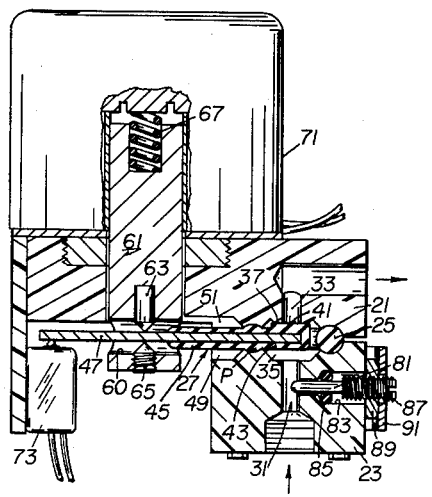
FIG. 2 is a midsectional view through a valve of the present invention in its closed position, FIG. 2 being on a larger scale than FIG. 1.

The left-hand portion of the actuating element in FIG. 2 passes through an opening 60 in a solenoid plunger 61, there being a fixed fulcrum element 63 and an adjustable fulcrum element 65 on the plunger engaging the opposite sides of the lever 47.

A compression spring 67 applies downward pressure on the plunger 61 and thus on the left-hand end of the lever 47, causing the lever to apply upward pressure on the valve element 41 to cause it to tightly engage the seat 37. It is also pointed out that the pressure of the fluid in the inlet passage 31 applies a closing pressure to the valve element.

The solenoid plunger 61 is surrounded by a coil (not shown) contained within a solenoid housing 71.

A micro-switch 73 is mounted on the member 21 and engaged by the left-hand end of the lever 47. The switch controls another valve to supply a second fluid simultaneously with the supply of fluid through the valve shown in FIG. 2. For instance, the second fluid may be soda to be mixed with the Tom Collins syrup as the two fluids are discharged from the nozzle unit 11.

Figure 4:
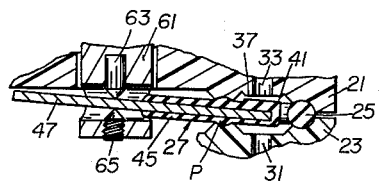
FIG. 4 is a fragmentary sectional view of the valve showing it in its open position.
Figure 5:
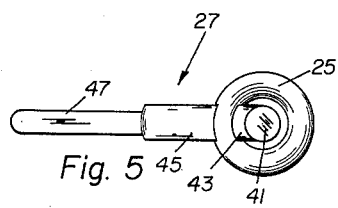
FIG. 5 is a plan view of an important part of the valve.
Figure 3:
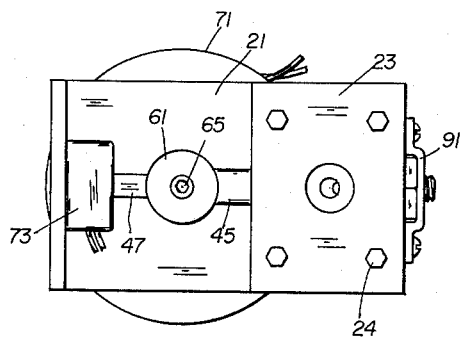
FIG. 3 is a bottom view of the valve of FIG. 2.

To open the valve of FIG. 2, the solenoid coil is energized by depressing the appropriate switch 13 to pull the plunger 61 upwardly to pivot lever 47 to move the valve element 41 away from the seat 37, as shown in FIG. 4. Simultaneously the microswitch 73 is released to its closed position to energize a companion solenoid.

A proportioning valve is provided on the body member 23 and includes an elongated valve member 81 projecting through a cross passage 83 into the passage 31. An O-ring 85 fits in the cross passage 83 and around the member 81 in sealing relation therewith.

The valve member 81 has a threaded portion 87 received by a nut 89 held against the body member 23 by a bracket 91. By rotating the member 81, the flow through the passage 31 can be regulated and proportioned in relation to the flow through the companion valve, previously mentioned.

The valve member 27 may be readily formed by molding the parts 25, 43 and 27 around the actuating lever 47.

Figure 6:
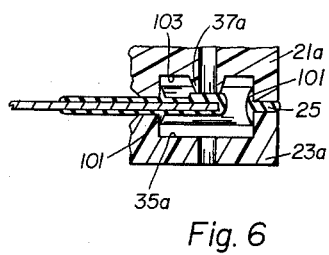
FIG. 6 is a fragmentary sectional view of a modified form of valve.

In FIG. 6, the elastomer member 25 is equipped with annular flanges or lips 101 which are pressed by the pressure, in the cavity 35a and in a cavity 103 surrounding the raised seat 37a, against the lateral walls defining the cavities to form a seal therewith. The portions of the member 25 between the opposed portions of the body members 21a and 23a are of rectangular cross section rather than being circular.

Having described the invention in what is considered to be the preferred embodiment thereof, it is desired that it be understood that the invention is not to be limited other than by the provisions of the following claim.

I claim:

A valve comprising an elastomer member having a flow passage opening therethrough, an actuating member extending through a portion of said elastomer member and projecting into said opening, and a valve member on the projecting portion of said actuating member, and a valve body having portions in compressed engagement with the opposite sides of said elastomer member and including inwardly facing walls through which are provided flow passages leading to and from said opening, said elastomer member having lip portions engaging said inwardly facing walls of said body to form a seal therewith, said body providing a valve seat surrounding a flow passage and against which said valve member seats, said valve member being of elastomer material and constituting an integral extension of said elastomer member.

References Cited in the file of this patent

UNITED STATES PATENTS

| | | |
|---|---|---|
| 2,539,559 | Ward | Jan. 30, 1951 |
| 2,780,232 | Ney | Feb. 5, 1957 |
| 2,809,800 | Ahl | Oct. 15, 1957 |
| 2,893,684 | Williams | July 7, 1959 |
| 2,989,283 | Klinger | June 20, 1961 |